April 25, 1961     W. K. KYLE     2,981,479
AIR HEATING SYSTEMS
Filed June 29, 1959     2 Sheets-Sheet 2
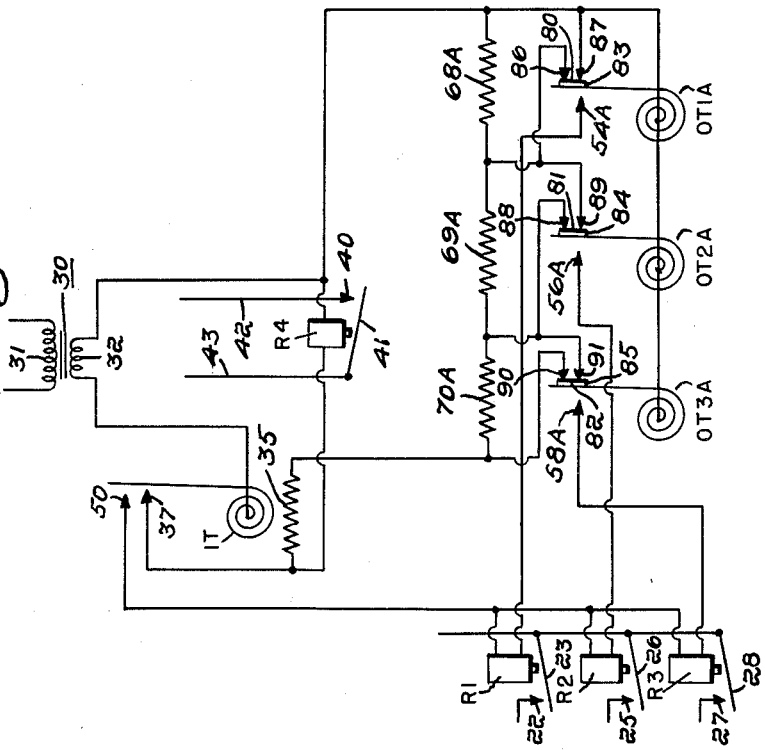
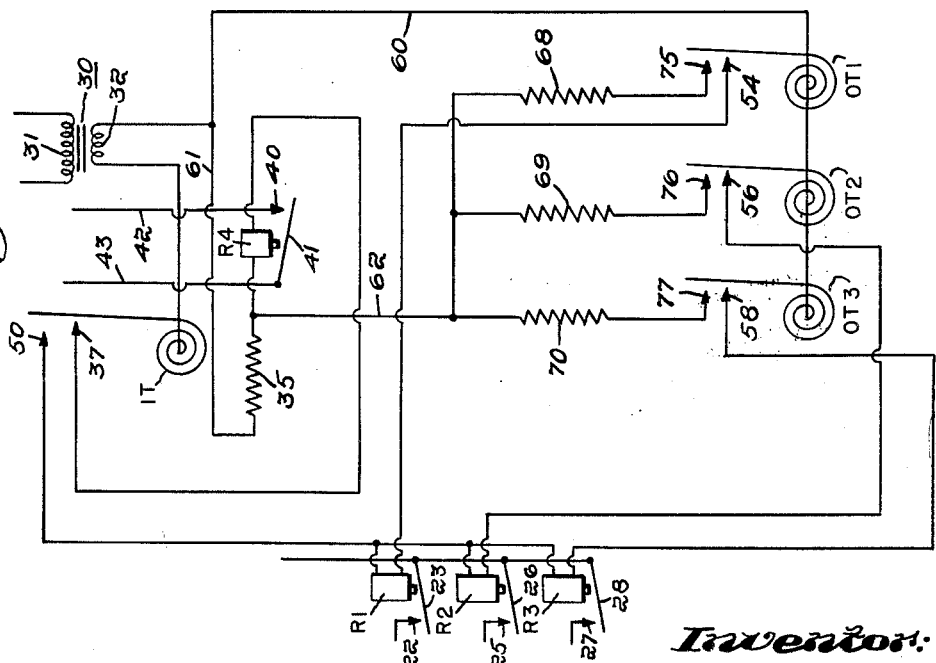
Inventor:
William K. Kyle,
by Robert T. Palmer Attorney United States Patent Office 2,981,479
Patented Apr. 25, 1961

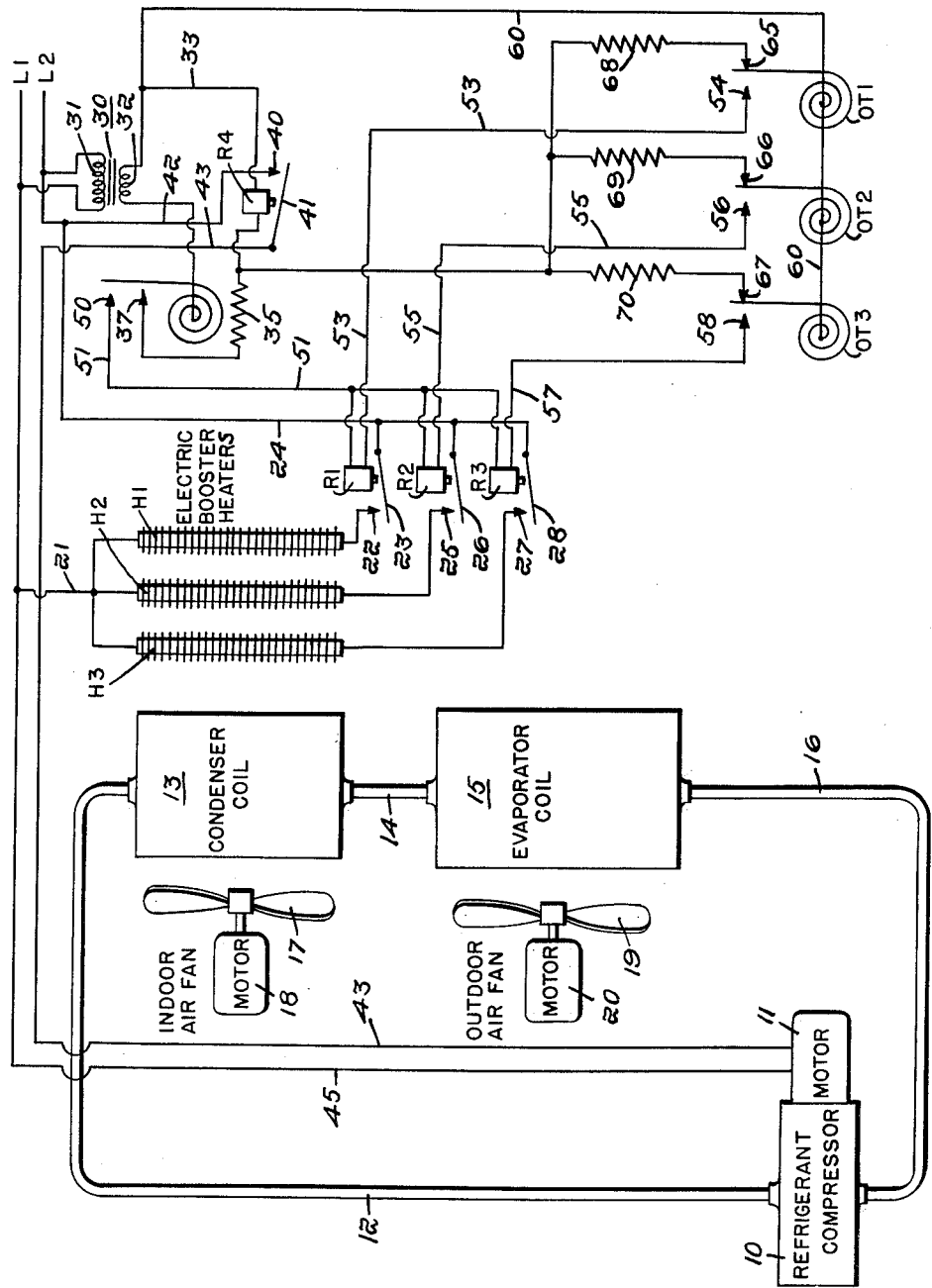

2,981,479
AIR HEATING SYSTEMS

William K. Kyle, Staunton, Va., assignor to Westinghouse Electric Corporation, East Pittsburgh, Pa., a corporation of Pennsylvania Filed June 29, 1959, Ser. No. 823,709

5 Claims. (Cl. 236—68)

This invention relates to air heating systems, and relates more particularly to air heating systems using heat pumps as sources of heat.

As disclosed in the U.S. Patent No. 2,806,674 of G. L. Biehn, in cold climates, it is desirable to use booster heaters with heat pumps, the booster heaters being energized under control of an indoor thermostat and one or more outdoor thermostats. Upon a predetermined drop in outdoor temperature, an outdoor thermostat acts to partially complete a circuit for energizing a booster heater, and if the heat pump alone cannot handle the load, the indoor thermostat which turned on the heat pump at a predetermined indoor temperature, completes the energizing circuit of the booster heater at a predetermined lower indoor temperature.

Heat anticipators are frequently used with indoor thermostats, and usually consist of electric resistance heaters which are energized when the indoor thermostats call for heat, and heat the bimetallic elements of the thermostats for overcoming lag. As outdoor temperatures decrease, it is desirable to decrease the heat added by such anticipators to their associated thermostats so that the latter will keep heat on for longer periods of time. Prior systems for accomplishing this have not only required special indoor thermostats, but have not been suitable for use with heat pumps having booster heaters.

This invention uses one or more outdoor thermostats to control the resistances of resistors in the heat anticipator energizing circuit of an indoor thermostat, for decreasing the current flowing through the anticipator when the outdoor temperature decreases. Preferably, the same outdoor thermostats that are used in the booster heater circuits of heat pumps are also used to control the currents flowing through the heat anticipators of the indoor thermostats of the heat pumps. This compensates for so-called "thermostat droop" which is a shift in the operating control point which causes a thermostat to control at a temperature different from that set by the thermostat adjusting device, and for the cold wall effect caused by falling outdoor temperatures. In the case of a two-stage heat pump system such as is disclosed in said patent with a heat anticipator added to its indoor thermostat, the operating control point of the indoor thermostat can be raised to compensate not only for droop and cold wall effect but for the differential between the two operating points of the indoor thermostat.

An object of this invention is to improve thermostat droop compensating systems.

Another object of this invention is to provide a thermostat droop compensating system which is especially suited for use with two-stage heating systems.

Another object of this invention is to provide a thermostat droop compensating system which is especially suited for use with heat pumps having booster heaters.

This invention will now be described with reference to the annexed drawings, of which:

Fig. 1 is a simplified, diagrammatic view of one embodiment of this invention;

Fig. 2 is a modification of the thermostat droop compensating portion of the system of Fig. 1, and Fig. 3 is another modification of the thermostat droop compensating system.

Referring first to Fig. 1, a refrigerant compressor 10 driven by an electric motor 11, has its high pressure side connected by discharge gas tubing 12 to the refrigerant input of a condenser coil 13, the refrigerant output of which is connected by capillary tube 14 to the refrigerant input of evaporator coil 15, the refrigerant output of which is connected by suction gas tubing 16 to the suction side of the compressor 10. The coils 15 and 16 are preferably finned coils adapted to have air blown over their finned surfaces. The capillary tube 14 is a two-way expansion device enabling the heat pump to be used for air cooling in summer when the flow of refrigerant is reversed.

A fan 17 driven by an electric motor 18, blows air from indoors or indoor air mixed with outdoor air, to be heated, over the condenser coil 13. Another fan 19 driven by an electric motor 20, blows outdoor air over the evaporator coil 15. In winter operation, heat absorbed from the outdoor air is added to the indoor air in heat pump operation.

Since in relatively cold climates, it is not practical to provide a heat pump capable of heating alone the indoor air to be heated at extremely low outdoor temperatures, it is desirable to use electrical booster heaters H1, H2 and H3 at the air outlet side of the condenser coil 13. Corresponding ends of these heaters are connected together and by wire 21 to electric supply line L1. The other end of the heater H1 is connected to fixed contact 22 of relay R1 which has an armature 23 connected by wire 24 to electric supply line L2. When the relay R1 is energized, it pulls up its armature 23 against its contact 22, connecting the heater H1 across the supply lines L1 and L2. The other end of the heater H2 is connected to fixed contact 25 of relay R2 which has an armature 26 connected by the wire 24 to the supply line L2. When the relay R2 is energized, it pulls up its armature 26 against its contact 25, connecting the heater H2 across the supply lines L1 and L2. The other end of the heater H3 is connected to fixed contact 27 of relay R3 which has an armature 28 connected by the wire 24 to the supply line L2. When the relay R3 is energized, it pulls up its armature 28 against its contact 27, connecting the heater H3 across the supply lines L1 and L2.

A step-down transformer 30 has a primary winding 31 connected to the supply lines L1 and L2, and has a secondary winding 32 connected at one end by wire 33 to one side of relay R4, the other side of which is connected to one end of heat anticipator resistor 35 of indoor thermostat IT. The other end of the resistor 35 is connected to contact 37 of the thermostat IT. The latter is connected by wire 38 to the other end of the transformer secondary winding 32. When the thermostat IT touches its contact at, say 70° F., the relay R4 is energized. The relay R4 has a fixed contact 40 connected by wire 42 to supply line L2, and has an armature 41 connected by wire 43 to the compressor motor 11 which is also connected by wire 45 to the supply line L1. When the relay R4 is energized, it pulls up its armature 41 against its contact 40, connecting the compressor motor 11 to the supply lines L1 and L2, starting the compressor 10 to supply heat to the indoor coil 13.

The indoor thermostat IT has another contact 50 which it touches when the indoor temperature drops to, say 68° F., and which is connected by wire 51 to corresponding sides of the relays R1, R2 and R3. The other side of the relay R1 is connected by wire 53 to contact 54 of outdoor thermostat OT1. The other side of the relay R2 is connected by wire 55 to contact 56 of outdoor thermastat OT2. The other side of the relay R3 is connected by wire 57 to contact 58 of outdoor thermostat OT3. The contacts 58, 56 and 54 are normally spaced from the outdoor thermostats OT3, OT2 and OT1 respectively. The outdoor thermostats are connected by wire 60 to one end of the transformer secondary winding 32.

When the indoor thermostat IT touches its contact 50, it connects, through wire 38, thermostat IT, the contact 50 and the wire 51, corresponding sides of the relays R1, R2 and R3 to one end of the secondary winding 32, partially completing the energizing circuits of these relays.

When the outdoor thermostat OT1 touches its contact 54 at, say 25° F., it connects the relay R1 to the other end of the winding 32, in a circuit including the wire 60, the thermostat OT1, the contact 54 and the wire 53. The relay R1 is thus energized, and pulls up its armature 23 against its contact 22, energizing the booster heater H1.

When the outdoor thermostat OT2 touches its contact 56 at, say 20° F., it connects the relay R2 to the other end of the winding 32, in a circuit including the wire 60, the thermostat OT2 and the wire 55. The relay R2 is thus energized and pulls up its armature 26 against its contact 25, energizing the booster heater H2.

When the outdoor thermostat OT3 touches its contact 58 at, say 15° F., it connects the relay R3 to the other end of the winding 32 in a circuit including the wire 60, the thermostat OT3 and the wire 57. The relay R3 is thus energized, and pulls up its armature 28 against its contact 27, energizing the heater H3.

The outdoor thermostats OT1, OT2 and OT3 have other contacts 65, 66 and 67 respectively, which they normally touch, and which are connected to corresponding ends of resistors 68, 69 and 70 respectively, the other ends of which are connected by wire 71 to the junction of the relay R4 and the resistor 35. The thermostats OT1, OT2 and OT3 are connected by wire 60 to the relay R4. The resistors 68, 69 and 70 are thus connected in parallel with the relay R4 which is in series with the resistor 35. When the indoor thermostat IT touches its contact 37 for turning the heat pump on, the heat anticipator resistor 35 is energized to heat the thermostat IT for overcoming lag. At outdoor temperatures above 25° F., the resistors 68, 69 and 70 are in parallel with the relay R4.

If the outdoor temperature drops to 25° F., the thermostat OT1 leaves its contact 65, disconnecting the resistor 68 from across the relay R4, thus reducing the current flowing through the resistor 35, and the heat added by it to the thermostat IT. If the outdoor temperature drops to 20° F., the outdoor thermostat OT2 leaves its contact 66, disconnecting the resistor 69 from across the relay R4, thus further reducing the current through the resistor 35. If the outdoor temperature drops to 15° F., the outdoor thermostat OT3 leaves its contact 67, disconnecting the resistor 70 from across the relay R4, further reducing the current through the resistor 35. The indoor thermostat IT thus stays on for longer periods of time as the outdoor temperatures fall, and keeps the heat pump and the booster heaters on for longer periods of time, compensating for droop and cold wall effect.

Fig. 2 is a modification of the system of Fig. 1, in that the resistors 68, 69 and 70, instead of being normally connected in parallel with the relay R4, are arranged to be connected by normally open contacts of the outdoor thermostats across the resistor 35 when the outdoor temperature drops to the operating points of the outdoor thermostats. The thermostats OT1, OT2 and OT3 are connected by the wires 60 and 61 to one end of the resistor 35, and have normally open contacts 75, 76 and 77 respectively, connected in series with the resistors 68, 69 and 70 respectively, which are connected by wire 62 to the other end of the resistor 35. When the thermostats OT1, OT2 and OT3 touch their contacts 75, 76 and 77 respectively, the resistors 68, 69 and 70 respectively, are connected in parallel with the resistor 35, decreasing the current flow through it, and the heat added by it to the indoor thermostat. The total current in the energizing circuit of the resistor 35 is not changed substantially by the shunting of the resistors 68, 69 and 70 across the resistor 35, since such current depends upon the impedance of the relay R4 which is substantially higher than the resistance of the resistor 35. Otherwise, the circuit of Fig. 2 is similar to the corresponding portion of the circuit of Fig. 1.

The droop compensating circuits of Figs. 1 and 2 require that the heat anticipator resistor 35 be energized through its series connected load, which in the illustrated embodiments of the invention is the relay R4. If a relay having a different resistance is used, or if a gas valve solenoid having a resistance different from that of R4 is used as the load, then the values of the resistors 35, 68, 69 and 70 would have to be correspondingly changed. In the circuit of Fig. 3, the relay R4 is out of the energizing circuit of the resistor 35, so that the resistance of the relay R4 can be changed without the requirement that the resistances of the resistor 35 and its associated resistors be changed.

In Fig. 3, the resistor 35 and resistors 68A, 69A and 70A are arranged to be connected in series across the winding 32 when the indoor and outdoor thermostats operate. The relay R4 is connected across the winding 32 when the indoor thermostat IT touches its contact 37. Outdoor thermostats OT1A, OT2A and OT3A have metal contact surfaces 80, 81 and 82 respectively, insulated therefrom by insulating strips 83, 84 and 85 respectively. Contacts 86 and 87 are connected to the ends of the resistor 68A, and are normally in contact with the contact surface 80. Contacts 88 and 89 are connected to the ends of the resistor 69A, and are normally in contact with the contact surface 81. Contacts 90 and 91 are connected to the ends of the resistor 70A, and are normally in contact with the contact surface 82.

The resistor 35 is normally connected in series with the resistor 68A shunted by the contacts 86 and 87 and the contact surface 80, the resistor 69A shunted by the contacts 88 and 89 and the contact surface 81, and the resistor 70A shunted by the contacts 90 and 91 and the contact surface 82, across the winding 32 when the indoor thermostat IT touches its contact 37.

When the outdoor temperature drops to 25° F., the outdoor thermostat OT1A moves its contact surface 80 away from its contacts 86 and 87, removing the shunt from across the resistor 68A so that the latter is connected in series with the resistor 35, reducing the current through the latter. Likewise, when the outdoor temperature drops to 20° F., the outdoor thermostat OT2A moves its contact surface 81 away from contacts 88 and 89, removing the shunt across the resistor 69A so that the latter is connected in series with the resistors 35 and 68A, further reducing the current through the resistor 35. Likewise, when the outdoor temperature drops to 15° F., the outdoor thermostat OT3A moves its contact surface 85 away from its contacts 90 and 91, removing the shunt from across the resistor 70A, so that it is in series with the resistors 35, 69A and 68A, further reducing the current through the resistor 35.

The relays R1, R2 and R3 are energized differently in the circuit of Fig. 3. The thermostats OT1A, OT2A and OT3A are connected together and to one end of the transformer winding 32, and have contacts 54A, 56A and 58A respectively, connected to the energizing windings of the relays R1, R2 and R3 respectively. The contacts 54A, 56A and 58A are normally spaced from their respective outdoor thermostats. When the outdoor temperature drops to 25° F., the thermostat OT1A touches its contact 54A, connecting one end of the winding 32 to one end of the relay R1. When the outdoor temperature drops to 20° F., the thermostat OT2A touches its contact 56A, connecting said one end of the winding 32 to one end of the relay R2. When the outdoor temperature drops to 15° F., the thermotat OT3A touches its contact 58A, connecting said one end of the winding 32 to one end of the relay R3. The other ends of the relays R1, R2 and R3 are connected to the contact 50 of the indoor thermostat IT, and their energizing circuits are completed when the indoor thermostat IT touches its contact 50, the circuits being completed through contact 50, the thermostat IT, the contact 37 of the latter, and the other end of the winding 32.

What is claimed is:

1. In a heating system having a prime heater, a booster heater, an indoor thermostat, an outdoor thermostat, a heat anticipating resistor for heating said indoor thermostat, a first circuit including said indoor thermostat for energizing said prime heater and said resistor when the indoor temperature is at a predetermined level, a second circuit partially completed by said indoor thermostat when the indoor temperature is at a predetermined level lower than said first mentioned level, for energizing said booster heater, and means including said outdoor thermostat for completing said second circuit when the outdoor temperature is at a predetermined level, the improvement comprising normally inactive means in said first circuit for decreasing the flow of current through said anticipating resistor, and means including said outdoor thermostat for activating said inactive means to reduce the current flowing through said anticipating resistor when the outdoor temperature is at said last mentioned level.

2. The invention claimed in claim 1 in which said last mentioned means includes a second resistor, and includes means connecting said second resistor in series in said first circuit with said anticipating resistor.

3. The invention claimed in claim 1 in which said last mentioned means includes a second resistor, and includes means connecting said second resistor across said anticipating resistor.

4. The invention claimed in claim 1 in which said first circuit includes an electromagnet for energizing said prime heater, and in which the last mentioned means includes a resistor normally connected across said electromagnet, and includes means for disconnecting the last mentioned resistor from across said electromagnet.

5. The invention claimed in claim 1 in which said first circuit includes an electromagnet in series with said anticipating resistor, for energizing said prime heater, and in which the last mentioned means includes a second resistor, and includes means connecting said second resistor across said anticipating resistor.

References Cited in the file of this patent
UNITED STATES PATENTS

| | | |
|---|---|---|
| 1,997,559 | Hajek | Apr. 9, 1935 |
| 2,061,536 | Dillman | Nov. 17, 1936 |
| 2,258,385 | Hartmann-Riis | Oct. 7, 1941 |
| 2,339,635 | Hall | Jan. 18, 1944 |
| 2,402,177 | Miller | June 18, 1946 |